BINARY NUMBERS COMPARATOR CIRCUIT

Original Filed Oct. 25, 1962 3 Sheets-Sheet 1

BINARY NUMBERS COMPARATOR CIRCUIT

Original Filed Oct. 25, 1962

Sept. 16, 1969 D. J. STEFANIK 3,467,946

BINARY NUMBERS COMPARATOR CIRCUIT

Original Filed Oct. 25, 1962 3 Sheets-Sheet 3

United States Patent Office 3,467,946
Patented Sept. 16, 1969

3,467,946
BINARY NUMBERS COMPARATOR CIRCUIT

Donald J. Stefanik, Berwyn, Ill., assignor to SCM Corporation, New York, N.Y., a corporation of New York
Original application Oct. 25, 1962, Ser. No. 233,109, now Patent No. 3,291,909, dated Dec. 13, 1966. Divided and this application May 2, 1966, Ser. No. 546,808
Int. Cl. G06f 7/02, 11/00
U.S. Cl. 340—146.2 4 Claims

ABSTRACT OF THE DISCLOSURE

There is disclosed a control system including comparator circuit for determining whether binary numbers presented by two groups of binary registers are identical. The complementary outputs of corresponding registers are interconnectet by resistor-diode series circuits. The nodes formed by the junctions of the resistors and the diodes are then connected to a common lead by diodes. The potential on the common lead then is used as an indication of whether the binary numbers presented by the registers are equal.

This invention relates to an electronic comparator circuit disclosed in a receiving page printer utilizing a continuously rotating print drum and a traveling print hammer carriage for telegraphic communication systems. Nevertheless, the comparator circuit is versatile and readily adapted for use with other data processing applications. This application is a division of co-pending application Ser. No. 233,109, filed Oct. 25, 1962, now Patent No. 3,291,909.

Briefly, in the exemplary drum type of page printer to which the present invention is applicable, the rotating drum is composed of a plurality of rings of type, the type symbols in each ring being arranged in identical sequence and aligned with matching type symbols. A print hammer, which is mounted upon a print hammer carriage assembly, is moved from left to right in front of the drum and is actuated to press an ink ribbon against the paper record and the drum at an appropriate rotational position of the drum to print a desired character at that carriage position. A pulse clock assembly on the rotating drum supplies a series of pulses, as the drum rotates, to the printer electronics in accord with the angular positions of the characters on the drum. The pulses are processed in the printer electronics and compared by the novel comparator system to the incoming or monitored keyboard signals to thereafter cause energization of the print hammer solenoid as the desired character moves in front of the hammer. Characters on each ring of type are identical and are placed in binary order according to the desired code. Each character is assigned a position in binary progression of a counter, e.g., a 64 count counter, so that the printer electronics can compare an incoming character code signal combination against the series of pulses that indicate the physical position of the drum characters. The electronic comparator circuit of the present invention enables continuous counting and comparison.

The comparing circuitry consists of a comparator network group of network circuits between dual outputs from correlated registers in the two register groups, each comparator network circuit including diode-resistor series paths between individual ones of the dual leads of a first group register and reversed individual ones of the dual leads of the corresponding second group register, and a common lead connected to all diode-resistor junctions to pass an information signal when all junctions are at a balanced level condition indicating complete coincidence, each connection from the common lead to a junction including a diode and each diode being connected to permit current flow toward the associated junction.

Figure 1:
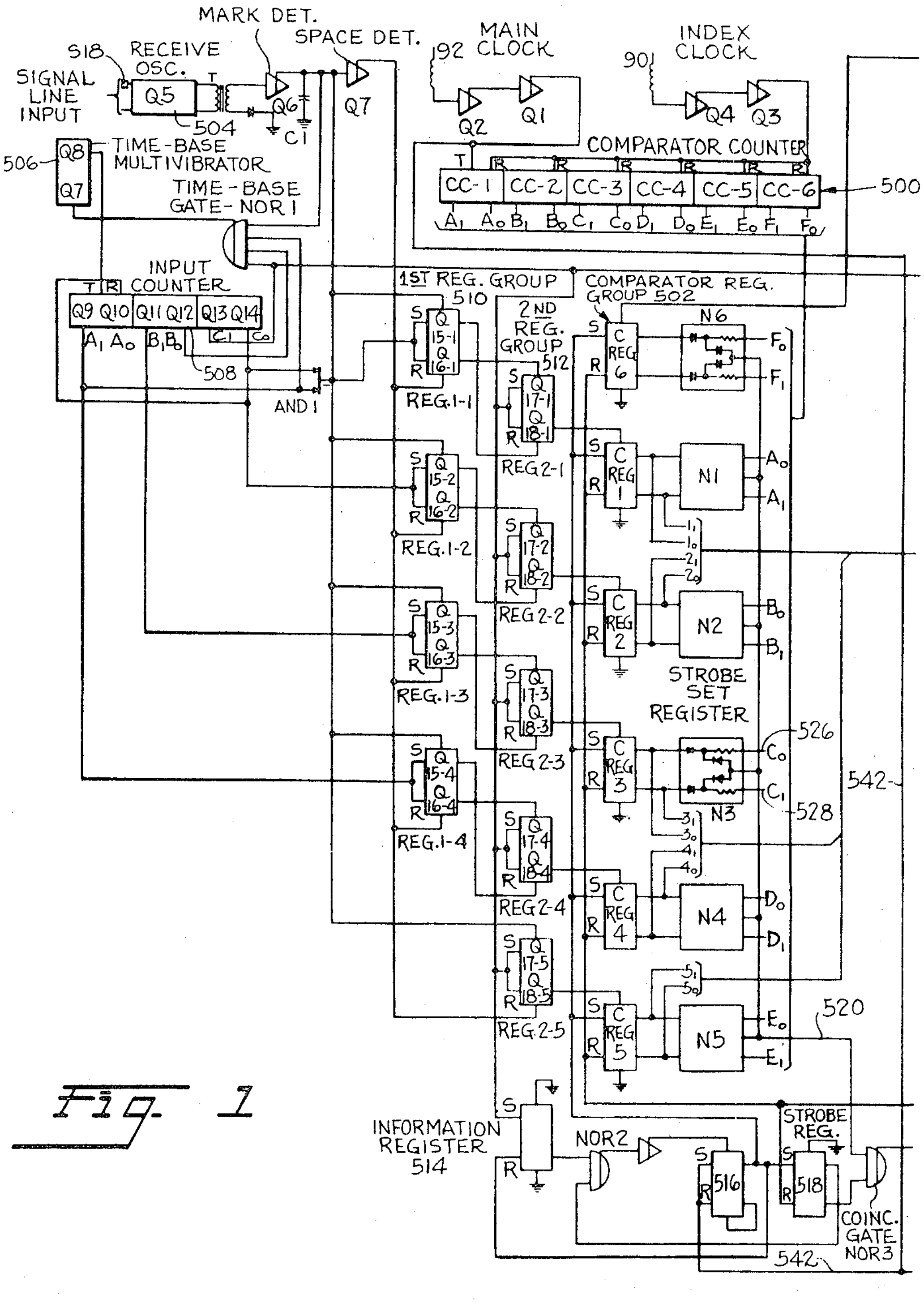
Figure 2:
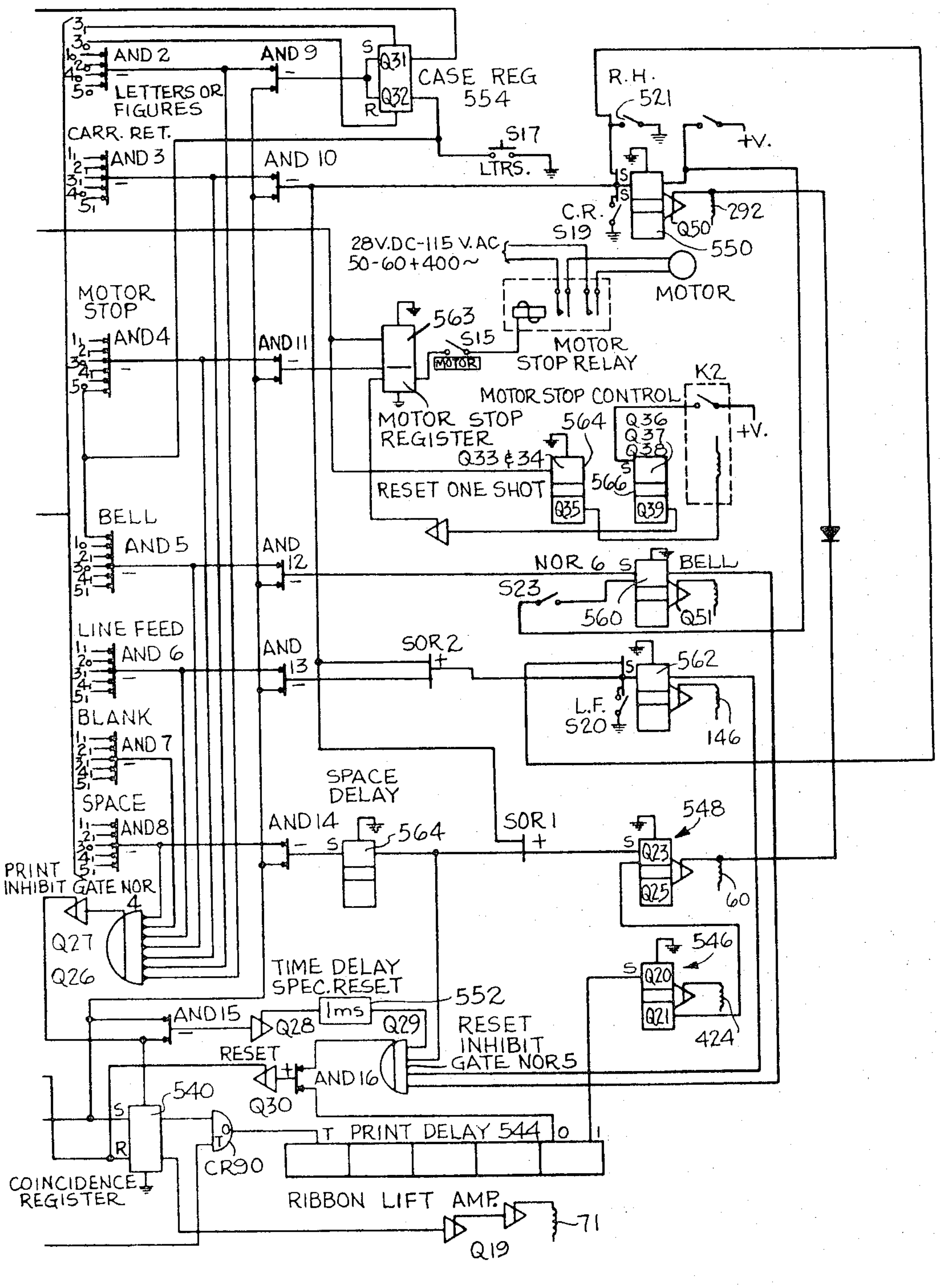
Figure 3:
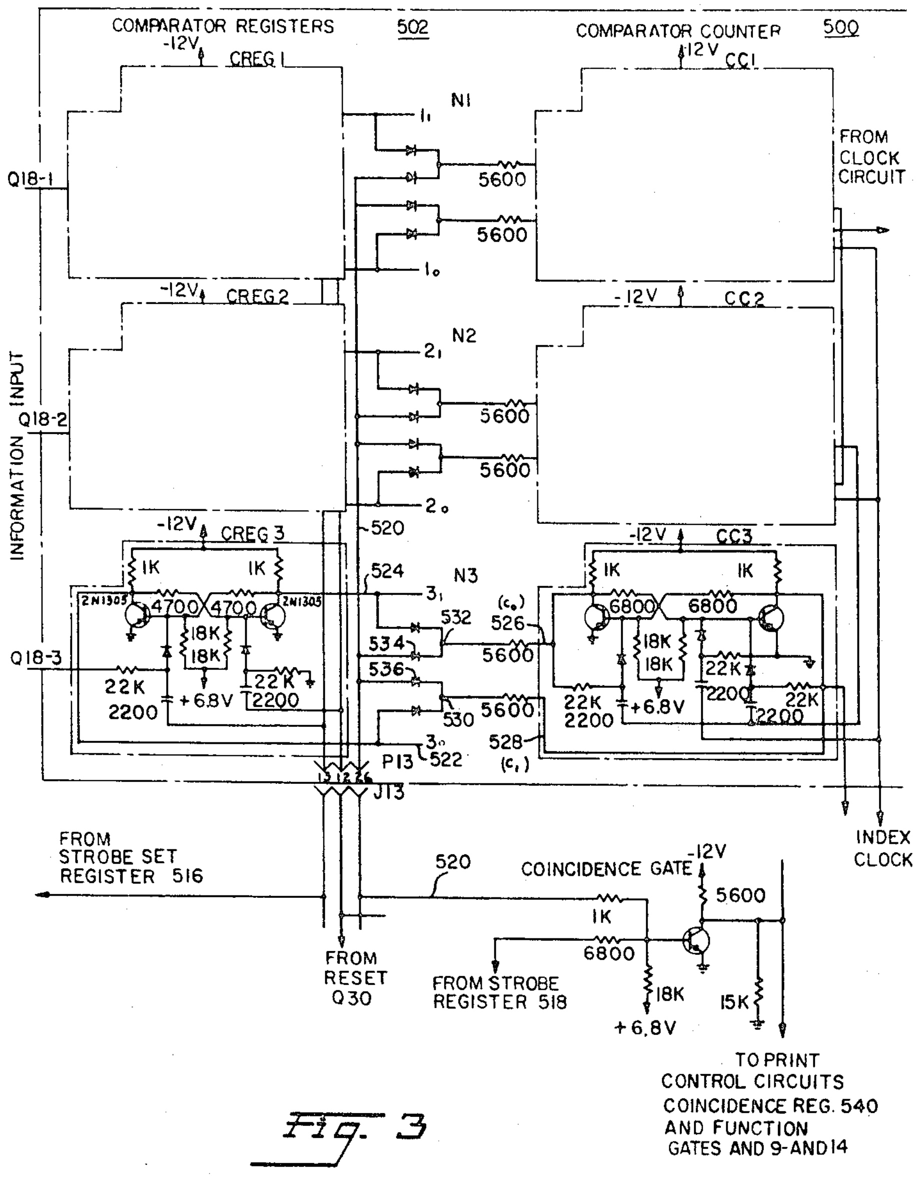

FIGURES 1 and 2 together constitute a schematic block diagram of the electronics circuitry for a single hammer printer arranged for reception of the Baudot Code; and FIGURE 3 is a detail schematic diagram showing several comparator registers, their associated comparator counter flip-flops and the novel comparator network of this invention connected between correlated registers to enable an information signal responsive to coincidence between correlated registers.

SINGLE HAMMER ELECTRONICS

Clock pulses

The electronic logic circuits for a single print hammer printer arranged for receiving five unit Baudot Code is illustrated in FIGURES 1 and 2. As a clock wheel rotates in front of the two clock coils (reading heads) 90 and 92, the clock wheel notches vary the reluctance of the bar type magnets located in the coils, inducing current pulses into the clock transistor amplifiers Q2 and Q4.

Sixty-four notches around the edge of the clock wheel are monitored by the main clock coil 92. Therefore, each of the 64 clock pulses represents a new character in the printing position, or in a predetermined position relative to the printing position and, through the medium of the electronics, result in energizing the print hammer solenoid 424 the instant the desired character moves in front of the hammer.

A single hole, towards the center of the clock wheel 58, is monitored by the index clock coil 90. The resulting one index pulse per drum revolution is used to reset a comparator counter 500. The index pulse is effective in initial synchronization of the type drum with the comparator counter when power is first supplied to the motor B1. Subsequent index pulses, although present, are ineffective, since the counter 500 resets itself upon reaching a count of 64 during each drum revolution.

*Comparator counter.*—The 6-stage comparator counter 500 is stepped continually by main clock pulses. Two output leads from each of the six counter flip-flop stages connect to a corresponding individual comparator network, desginated by reference characters N1 through N6, for comparison with the incoming character which will appear in the comparator register group 502.

Input detector and input counter

*Line termination.*—The two-wire signal line from either a local or remote transmitter terminates on a receive oscillator 504 that is extremely sensitive to changes between mark and space. The astable (that is, free running) receive oscillator 504 runs only during a mark condition on the line. Oscillations of approximately 50 kc. exist during all mark conditions, no oscillations during space conditions. A transition between mark and space starts or stops the oscillator 504 within the time of two cycles of the 50 kc. rate. Transformer T1 provides DC isolation between the signal line and the printer electronics.

*Mark and space detectors.*—Mark detector transistor Q6 is kept on for a mark condition by the negative output swings of the receive oscillator. Capacitor C1 keeps the mark transistor Q6 on during the positive swings of the oscillator; this is necessary because the 50 kc. rate of the receive oscillator is within the switching frequency of mark transistor Q6. For a space condition the oscillator 504 turns off, allowing mark transistor Q6 to turn off. Time base gate NOR 1 provides an output ground level with Q6 off, allowing the time-base multivibrator 506 to step the input counter 508. Space detector transistor Q7 is turned on by the turning off of mark transistor Q6. The other function of the mark and space detectors Q6 and Q7 is to set or reset all of the associated flip-flops REG 1—1 through REG 1-4 of the first register group 510 and the fifth flip-flop REG 2–5 of the second register group 512.

Time base gate NOR 1 and time-base multivibrator

The astable time-base multivibrator 506 can be operated for line speeds of 60, 100, and 200 w.p.m. The frequency of the multivibrator is set for the various speeds by changing the resistance of the base circuits with a 3-position time base switch (not shown). Time base gate NOR 1 inhibits the time base multivibrator 506 until a start pulse is received from the signal line. This start pulse allows the output of time base gate NOR 1 to provide a ground level at the emitter of time base multivibrator transistor Q7 to start the multivibrator. Output pulses from the multivibrator 506 now step the input counter 508. During the stop pulse, time base gate NOR 1 switches to a negative level; therefore, the emitter of time base multivibrator transistor Q7 being at a negative level, stops the multivibrator.

*Input counter.*—The eight-count input counter 508 (1) gates the incoming code bits to the proper flip-flop of the first register group 510, (2) moves the information to the second register group 512 during the fifth code bit, and (3) starts the printer motor B1. The input counter 508 is stepped by the time base multivibrator 506 at the desired 60, 100 or 200 w.p.m. speed. Since only seven counts are necessary to synchronize with the 7-bit Baudot code (five unit code plus the start and stop bits), a skip pulse is generated to allow the eight-count input counter 508 to complete its cycle once in seven counts. The skip pulse is inserted between the receipt of the first and second code bits. This skip pulse is almost instantaneous so as not to disrupt the synchronism between multivibrator 506 and line. The $C_0$ output lead of the input counter 508 is connected back to the $A_0$ side of the counter to produce a skip pulse. The skip pulse steps the A section of the counter into the second code bit condition and leaves the C sections of the counter in the proper condition for the second code bit. The input counter output pattern is as follows:

| $A^1$ | $A^0$ | $B^1$ | $B^0$ | $C^1$ | $C^0$ | |
|---|---|---|---|---|---|---|
| X. | 0 | 0 | X | 0 | X | START |
| 0 | X | 0 | X | 0 | X | #1 Bit |
| X | 0 | X | 0 | X | 0 | SKIP |
| 0 | X | X | 0 | X | 0 | #2 Bit |
| X | 0 | 0 | X | X | 0 | #3 Bit |
| 0 | X | 0 | X | X | 0 | #4 Bit |
| X | 0 | X | 0 | 0 | X | #5 Bit |
| 0 | X | X | 0 | 0 | X | STOP |

X=Negative level.
0=Ground level.

Registering a character

*First register group.*—The first register group 510 consists of four flip-flops REG 1—1 through REG 1–4. The first four code bits of an incoming sequential character are used initially to control the condition of these flip-flops. By the time the fifth code bit is received, the character previously stored in the second register group 512 has been shifted into the third or comparator register group 502. Therefore, the fifth code bit can be used to directly control the condition of the fifth flip-flop REG 2–5 of the second register group 510. This is why the first register group need have only four flip-flops. The output of the input counter 508 sequentially triggers the individual flip-flops of the first register group 510 under the sequentially changed control of the ground and negative levels from the mark and space detectors Q6 and Q7. The input counter 508 produces a triggering positive transition at the middle of each code bit from the signal line. This compensates for variations in the code bit length and in the multivibrator frequency. For a character with marks as the first four code bits, first register group 510 transistors Q15–1 through Q15–4 are turned off. For a character with space as the first four code bits, first register group transistors Q16–1 through Q16–4 are turned off.

*Second register group.*—The second register group 512 consists of five flip-flops REG 2–1 through REG 2–5. It stores a character until the previous code signal combination character is printed or the corresponding function is performed. As the fifth code bit is being received from the signal line, the first four code bits from the first register group 510 and the fifth code bit from the mark or space detector are shifted to the second register group 512. This shift of information from the first to second register group is accomplished as follows: The $C_1$ output of the input counter 508 provides a transition in the middle of the fifth code bit; this positive transition is used to gate the information which is stored in the first register group 510 into the second register group 512. Assume, for example, that a mark is to be transferred into the first flip-flop REG 2–1 of the second register group 512. If the flip-flop REG 2–1 is already set to mark, the upper transistor Q17–1 is off and the lower transistor Q18–1 is on. Since the same condition exists in the first flip-flop REG 1—1 of the first register group 510, the Q16–1 output lead has a ground level and the Q15–1 output lead has a negative level. Therefore, only the upper transistor Q17-1 of the second register group 512 can be turned off by the $C_1$ trigger pulse. Since it is already off, nothing happens. If a space was previously set into the flip-flop REG 2–1 of the second register 512, the upper transistor Q17–1 is on and, therefore, can be turned off by the $C_1$ triggering pulse of the input counter 508.

*Information register.*—The information register 514 is first set when new information is transferred into the second register group 512. A positive transition on the $C_1$ lead from the input counter 508 sets the information register 514. This set condition of register 514 places a ground level at one input of gate NOR 2. This level will be used later as an indication that a character is waiting to be compared.

*Strobe set register.*—The strobe set register 516 is used to transfer a new character into the comparator register group 502 and to set the strobe register 518. As soon as the information register 514 is set (new character waiting) and the strobe register 518 is reset (1st character printed or function performed), gate NOR 2 allows the strobe set register 516 to be set by the next main clock pulse and reset by the following clock pulse. When gate NOR 2 allows the strobe set register 516 to be triggered, the comparator register group 502 and the strobe register 518 are set. When the strobe set register 516 is immediately reset it resets the information register 514.

*Strobe register.*—After a character has been printed or the function has been performed, the strobe register 518 is reset as will be described hereinafter. In this reset condition coincidence gate NOR 3 is inhibited to prevent detection of coincidence between the comparator registers 502 and the comparator counter 500. Setting of the information register 514 by the next awaiting character shifting to second register group 512 now allows the strobe set register 516 to be triggered to set and then to reset which in turn again sets the strobe register 518. The strobe register 518, in set condition now (1) allows coincidence gate NOR 3 to detect coincidence between the comparator register group 502 and the comparator counter 500 and (2) inhibits gate NOR 2 to prevent setting of the strobe set register 516 until this character is processed.

Finding coincidence

When each flip-flop of the 64-count comparator counter 500 is set in the same binary information condition as the corresponding flip-flop of the comparator register group, it is coincidence and the character to be printed is 32 counts (that is, character positions on the drum) ahead of the print hammer. This coincidence condition is used to start ribbon lifting. Note: If a stationary ribbon stretch were to be used, there would be no need for the 32 count delay. Six comparator network circuits N1 through N6 make up the comparator that detects coincidence.

*Comparator register group* 502.—The comparator registers CREG 1 through CREG 5 receive a character from the second register group 512 when the strobe set register 516 is triggered to the set condition. The sixth flip-flop CREG 6 of the comparator register group 502 represents case information (Letters or Figures) and determines on which half of the print drum the character to be printed is located. The comparator registers CREG 1 through CREG 5 are set if a mark condition is present in the corresponding registers REG 2–1 through REG 2–5 of the second register group 512. If a space is present in a register of the second register group 512, the corresponding comparator is inhibited and cannot be set by the trigger pulse from the strobe set register 516. The comparator registers 502 are all triggered to reset condition by the reset amplifier at the end of the printing cycle.

*Comparator*.—Each of the six network circuits N1 through N6 of the comparator network group detects the moment when the flip-flops CC of the comparator counter 500 and the corresponding registers of the comparator register group 502 are in the same condition. For a given network circuit, this is known as a balanced condition. There are two inputs to a single network circuit from the associated comparator register, e.g., see CREG 3, and two inputs from the corresponding comparator counter flip-flop CC3 (see detail circuit in FIGURE 3). Keeping in mind that until coincidence is reached the comparator register will stay in its triggered condition, but the counter flip-flops are continually changing, in a given network circuit, balance occurs as soon as each comparator counter flip-flop has switched to the condition of the corresponding comparator register CREG. Balance is indicated electrically by a lack of current flow into the comparator network group from the common lead 520 that connects all six networks N1 through N6 to coincidence gate NOR 3. When all six networks N1 through N6 are balanced, all of the six networks N1 through N6 will block current flow in line 520 and coincidence exists. Consider the following example with respect to FIGURE 3: The third register CREG 3 of the comparator register group 502 is set so that the output lead 522 from the set side is at a ground level, and the output lead 524 from the reset side is at a negative level. The corresponding two leads 526($C_0$), 528($C_1$) from the comparator counter flip-flop CC3 which starts its count from a reset condition respectively extend a ground level and negative level to the network N3. Current flow from the common network lead 520 will be possible so long as one of the two output leads 526 or 528 from the comparator counter flip-flop CC3 is *effectively* negative. In the example being considered, the input 522 from the comparator register flip-flop CREG 3 is at a ground level and will, therefore, effectively place the diode-resistor junction 530 at ground level and nullify the level on lead 526 from comparator counter flip-flop CC3 connected to it regardless of whether the level on lead 526 is ground or negative. Coincidence in this specific network N3 therefore, is reached when the other level of comparator counter flip-flop CC3 on line 528 goes to ground level and nullifies the negative level on line 524 from the comparator register flop-flop CREG 3 by placing the second diode resistor junction 532 effectively at ground level. In each of networks N1 through N6 a diode 536 connected from coincidence line 520 to junction 530, and a diode 534 connected from coincidence line 520 to junction 532 permit current flow only from common line 520 to the networks. As soon as any of the diode-resistor junctions in the comparator network go to an effective negative level, coincidence is lacking.

*Coincidence gate* NOR 3.—Going back now to FIGURE 1, it is understood that the output of coincidence gate NOR 3 is normally at a ground level when the gate transistor is on. When complete coincidence occurs between the comparator register group 502 and the comparator counter 500 and the strobe register 518 is in set condition, gate NOR 3 transistor goes off and the gate output goes to a negative level for the duration of one clock pulse. The comparator output at coincidence will thus control the coincidence register 540 through gate NOR 3 only when the strobe register is set and therefore is holding gate NOR 3 open as has been described. Providing gate NOR 3 is open, the comparator output level at coincidence turns off gate NOR 3 for one clock pulse. After the one clock pulse, balance is no longer present in at least one of the networks N1 through N6 and coincidence in the entire comparator group is destroyed because at least one of the comparator counter flip-flops will have switched its two output levels. The transition from off back to on at the output of gate NOR 3 provides a trigger pulse to set the coincidence register 540 for a printable character or opens a conditioned one of gates AND 9 through AND 14 to allow one of the function detectors to trigger the indicated function.

Printing and spacing

*Coincidence register*.—The coincidence register 540 allows the printing cycle to begin. Note that setting of the coincidence register 540 is inhibited for a function operation (non-printable character) by the print inhibit gate NOR 4. However, for a printable character, when gate NOR 3 sets the coincidence register 540: (1) pulses from the main clock head 92, via line 542 and diode CR 90, are allowed to step the 32-count print delay counter 544; and (2) ribbon lifting is started.

*Ribbon lifting*.—So that a printed character can be read immediately after printing, the ribbon normally is below print level and must be raised momentarily each time the coincidence register 540 is set. The coincidence register 540, when set, allows high-power driver transistor Q19 to go on and supply energizing current to the ribbon lift solenoid 71, thereby causing lifting of the ribbon into the path of the print hammer.

*Print delay counter*.—As has been described, when coincidence occurs, the desirable printable character is 32 counts away from the print hammer. This delay between coincidence and printing insures sufficient time for the ribbon to be raised to print position in time to produce printing. Before the coincidence register 540 is set, main clock pulses cannot step the 32-count counter because the ground level from the set side of the coincidence register 540 back biases diode CR90 and blocks the clock pulses in line 542. When coincidence is reached and the coincidence register 540 is triggered to set, the resultant negative level from the set side will forward bias the diode CR90, allowing subsequent clock pulses to step the 32-count print delay counter 544. Within 32 counts, the ribbon will be in the proper position for printing. At the end of the 32 count, the delay counter 544 triggers a 600 micro-second print one-shot 546 (Q20 and Q21).

I claim:

1. An electronic comparator network group for determining coincidence between first and second binary information register groups, a first of which register groups, registers, stores and places a selected one of a plurality of binary information signal combinations on a series of dual outputs from respective first group registers and the other of said register group provides changing binary information on a series of dual outputs from respective second group registers, said comparator group consisting of a plurality of comparator network circuits between the dual outputs from correlated registers in the two register groups, each comparator network circuit including diode-resistor series paths between individual ones of the dual leads of a first group register and the opposite individual ones of the dual leads of the corresponding second group register, a common lead connected to all diode-resistor junctions to pass an information signal when all junctions are at a balanced level condition indicating complete coincidence of the information in both register groups, each connection from said common lead to a said junction including a diode and all diodes being connected to permit current flow toward its associated junction.

2. An electronic comparator circuit for comparing the outputs of two binary registers having regular and complementary outputs, said circuit comprising:

a pair of common nodes;

a resistive element connected to each common node;

a unidirectional conductive element connected to each common node to form series circuits with said resistive elements, said unidirectional conductive elements being oriented to conduct in the same direction with respect to said common nodes, and said resulting series circuits interconnecting the regular output of each register with the complementary output of the other register;

a common lead; and unidirectional conductive means connecting said common lead to each of said common nodes and oriented to conduct in the same direction with respect to said common node as said unidirectional conductive elements;

whereby the potential of said common lead is indicative of whether the two registers are in the balanced condition and thus contain the same information.

3. An electronic comparator network for comparing the contents of two groups of binary registers having regular and complementary outputs, said network comprising:

a quantity of common nodes equal to the quantity of registers in both groups;

a resistive element connected to each common node;

a unidirectional conductive element connected to each common node to form series circuits with said resistive elements, said unidirectional conductive elements being oriented to conduct in the same direction with respect to said common nodes, and said resulting series circuits interconnecting the output of each register with the complementary output of a corresponding register in the other group;

a common lead; and unidirectional conductive means connecting said common lead to each of said common nodes and oriented to conduct in the same direction with respect to said common node as said unidirectional elements;

whereby the potential of said common lead is indicative of coincidence of information between the two groups of registers.

4. An electronic comparator network in accordance with claim 3, including:

a source of pulses; and a NOR gate having two inputs connected respectively to the common lead and to said source of pulses.

References Cited

UNITED STATES PATENTS

| | | | |
|---|---|---|---|
| 3,000,001 | 9/1961 | Brink | 340—146.2 |
| 2,641,696 | 6/1953 | Woolard | 340—146.2 |
| 3,074,640 | 6/1963 | Maley | 307—215 X |
| 3,137,839 | 6/1964 | Rubin | 340—146.2 |
| 3,137,789 | 6/1964 | Chiapuzio | 340—146.2 X |
| 2,994,062 | 7/1961 | Chiapuzio | 340—146.2 |
| 3,075,176 | 1/1963 | Reynolds | 235—177 X |
| 2,979,695 | 4/1961 | Tyrlick | 340—146.2 |

MALCOLM A. MORRISON, Primary Examiner

EDWARD J. WISE, Assistant Examiner

U.S. Cl. X.R.

235—177; 340—149